Aug. 13, 1963

C. KOCH 3,100,429

PHOTOELECTRIC EXPOSURE METERING DEVICE
FOR PHOTOGRAPHIC DARKSLIDE CAMERAS

Filed July 19, 1961

Inventor
Carl Koch

By
Watson, Cole, Grindle & Watson

Aug. 13, 1963   C. KOCH   3,100,429
PHOTOELECTRIC EXPOSURE METERING DEVICE
FOR PHOTOGRAPHIC DARKSLIDE CAMERAS
Filed July 19, 1961   2 Sheets-Sheet 2
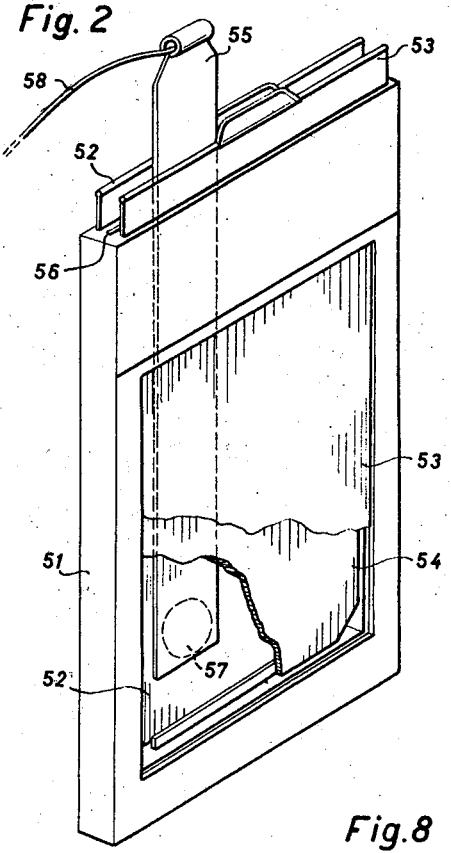
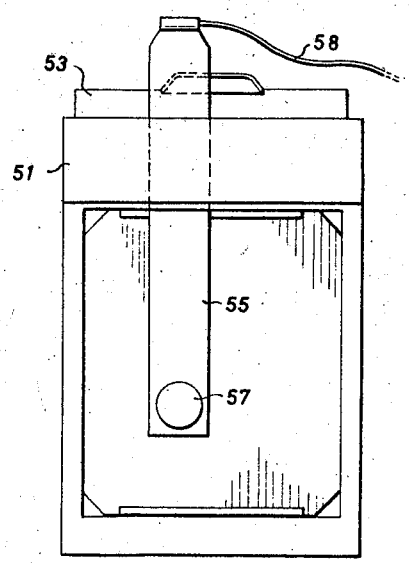
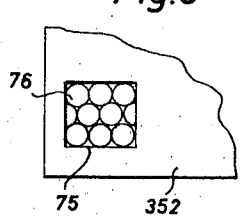
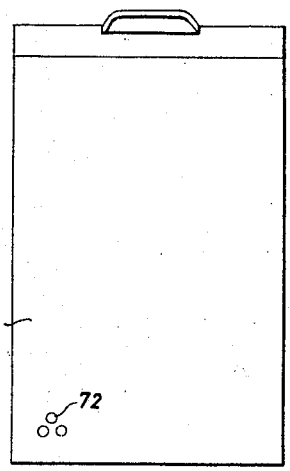
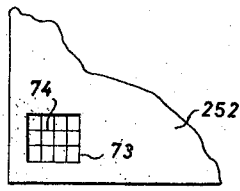
Inventor:
Carl Koch
By
Watson, Cole, Grindle + Watson
Attys.

United States Patent Office 3,100,429
Patented Aug. 13, 1963

3,100,429
PHOTOELECTRIC EXPOSURE METERING DEVICE FOR PHOTOGRAPHIC DARKSLIDE CAMERAS
Carl Koch, Vordersteig 2, Schaffhausen, Switzerland
Filed July 19, 1961, Ser. No. 126,851
Claims priority, application Austria July 29, 1960
3 Claims. (Cl. 95—10)

This invention relates to a photoelectric exposure metering device for darkslide cameras which are adapted to control the image by means of a groundglass, whereby the exposure metering device embodies a photoelectric cell with connected indicating instrument.

It is known to have a photoelectric cell movably arranged on a groundglass camera in front of the groundglass in order to be able to determine the brightness of various parts of the picture. The exposure metering device is thereby inseparably attached to the camera, so that it cannot be used with an already existing camera or a camera for another picture size. There are, of course, exposure metering devices which are independent of every camera, but in this case the measurement cannot be made through the camera lens. Certain embodiments of known exposure metering devices include their own lens and a groundglass on which the brightness of the various parts of the image can be measured with the assistance of a photoelectric cell. Such instruments, however, preclude accurate exposure metering if lenses with different focal length and of different kinds of glass, or various filters, are to be used on the camera. Furthermore, the known exposure metering devices that are separate from the camera cannot allow for the increase in exposure time which necessarily results from the use of various extension lengths on the camera, e.g. with macro- and microphotographs. The required exposure-time or shutter aperture setting cannot be determined directly and accurately with any of the hitherto known exposure metering devices which are separate from the camera. For perfect technical and model photographs, especially on color material, the preference should absolutely be given to exposure metering behind the lens and extension lengths that are actually used when taking the photograph.

All cameras with an exposure metering device arranged behind the lens which have appeared on the market to date were intended for amateur photographers. Such cameras are provided with lenses having relatively strong light intensity which permit short exposure times. The photoelectric cell and associated indicating instruments are not very sensitive, which is permissible owing to the relatively large diaphragm aperture of the camera. On the other hand, cameras for professionals are completely different. It is normal to use wide-angle lenses with small diaphragm apertures for long exposure times. A photoelectric cell and associated indicating instrument arranged behind the lens, perhaps in the plane of the image, must therefore have a much higher sensitivity in order that photometry is at all possible with the set shutter aperture and extension length. That is probably one of the main reasons why no professional camera, i.e. a universal camera with a photoelectric cell for exposure metering mounted in the plane of the image, has been put on the market to date.

The invention has for its object to close this gap and, in addition, to provide an exposure metering device which can also be used on already purchased and used darkslide cameras. In solving this problem it became clear that the extremely high sensitivity of the metering device, which is indispensible to a professional camera, required special means to protect the metering device. First of all, it must be possible to protect the photoelectric cell against the entrance of inadmissibly strong light from the front in order to ensure that neither the cell nor the indicating instrument is overloaded and no changes in calibration takes place owing to saturation when the device is removed from the camera. Furthermore, it must be possible to completely prevent the entrance of light from the rear through the groundglass onto the photoelectric cell during the actual measurement, since otherwise considerable errors are unavoidable on account of the high sensitivity of the metering device. The exclusion of light from the rear cannot be obtained by means of the usual light tunnel open at the back. Finally, it must be possible to control the image on the groundglass and the position of the photoelectric cell with reference to the image before taking the measurement, so that permanent closure of the device to the rear is not possible.

The solution to the manifold problem described in the foregoing was found according to the invention in that the photoelectric cell is disposed between two withdrawable measuring slides, and that the parts mentioned are assembled together with a frame-like housing to constitute a structural unit of which the external form is approximately similar to that of a darkslide, and can be attached to a camera instead of a darkslide.

Further features of the invention will appear from the claims, the description and the accompanying drawing, wherein there are shown, purely by way of example, some forms of embodiment incorporating the invention.

In said annexed drawing:

FIG. 2 is a perspective view, on a larger scale, of the exposure metering device alone without the indicating instrument, the individual parts of the device being cut away;

FIG. 3 is the front view of the same device without the indicating instrument and on a smaller scale, the photoelectric cell being in another position and the front light protecting slide removed.

FIG. 6 is a front view of the front light protecting slide of the exposure metering device;

FIGS. 7 and 8 show each another modified form of the front light protecting slide.

Figure 1:
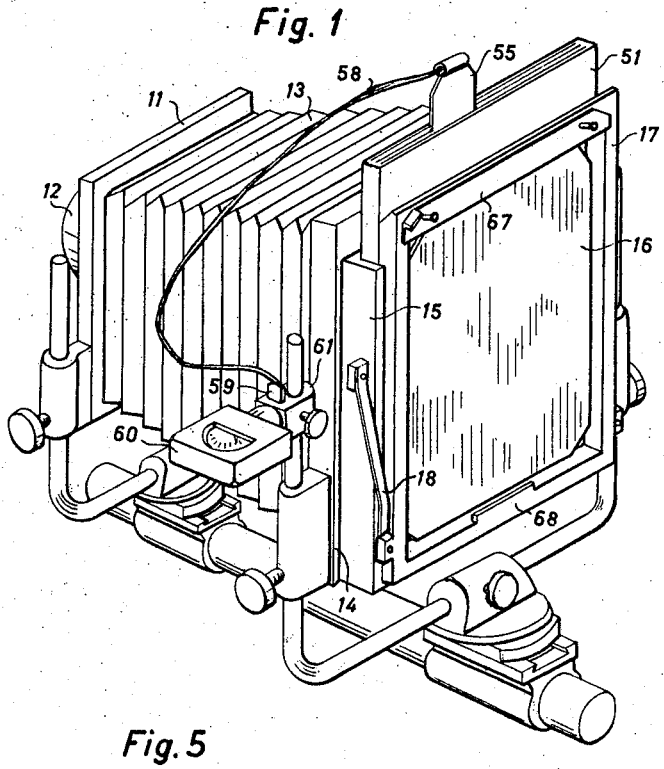
FIG. 1 shows a perspective view of a darkslide camera with a groundglass and a removable exposure metering device according to the invention.

The camera illustrated in FIG. 1 has a lens 12 on a front frame 11. By means of a folding bellows 13 the front frame 11 is joined to a rear frame 14 having attached thereto a support frame 15 for a darkslide and groundglass. A groundglass 16 serving for image control is mounted in a frame 17 which is joined to said frame by means of springs 18 in known manner so as to be movable rearwards against the action of said springs, i.e. away from the lens 12, in order to provide room for a darkslide which is inserted between the groundglass frame 17 and the support frame 15. The design of the camera so far described is known.

An exposure metering device, visible in FIGS. 1, 2 and 3, is removably mounted on the described darkslide camera. It includes a frame-like housing 51 which is closed by a front light protecting slide 52 and a rear light protecting slide 53. In FIG. 3 the front slide is removed and thus not visible. Said slides 52 and 53, which are impervious to light, are carried in slots and grooves in the housing 51 and can be withdrawn individually from above, as for a double darkslide. The light protecting slides 52 and 53 have arranged therebetween a glass plate 54 and a movable carrier arm 55 in the form of a flat bar. The latter projects through a slot 56 in the housing 51 and is movable both longitudinally and transversely. At one end the arm 55 carries a photoelectric cell 57, i.e. a selenium photocell or photo-sensitive resistor. The light-sensitive surface of the cell 57 is turned away from the glass plate 54 and faces the front light protecting slide 52. If both slides 52 and 53 are inserted, the photocell 57 is protected from the entry of light.

Through a two-core flexible cable 58 and a plug 59 the photocell 57 is connected to an electrical indicating instrument 60 which is detachably mounted on a part of the camera by means of a holder 61. The instrument 60 is preferably pivotal through approximately 270° with respect to the holder 61, so as to be visible from above, from the groundglass 16 and from the lens 12. The scale of the instrument 60 is calibrated in, say, lux or designed as for known exposure meters.

The action of the exposure metering device on the described camera is as follows:

After the camera has been adjusted to take a picture, which can be controlled on the groundglass 16, the brightness of various parts of the picture to be taken is measured by means of the exposure measuring device.

For this purpose, the housing 51 of the described exposure metering device is mounted on the darkslide camera instead of the usual darkslide, whereupon the two light protecting slides 52 and 53 are removed. The brightness of the various parts of the image projected onto the groundglass 16 can now be determined by suitably moving the carrier arm 55 so as to position the photoelectric cell 57 successively in front of those parts of the image of which the brightness is to be measured. By inserting the housing 51, the groundglass frame 17 is pushed back somewhat so that the image on the groundglass 16 is out of focus. Nevertheless, the momentary position of the cell 57 with respect to the image still remains perceptible through shadow formation on the carrier arm 55 on the groundglass 16. In this way the degree of brightness contrast in the picture and the most favorable exposure of the most important parts of the picture can be determined without having to leave the position at the camera. Heretofore, such measurement had to be carried out by approaching near to the object with an exposure meter, and this was usually inconvenient, time-consuming and in certain cases not possible, for instance if it is required to photograph a machine shop from a raised gallery or another motive over an intraversable obstacle. In addition, the measurements made with the exposure metering device according to the invention have the advantage that they automatically and correctly allow for the momentary camera extension and any filters being used. Having decided on the exposure time and the photographic material to be used, the two light protecting slides 52 and 53 are inserted into the housing 51, the plug 59 is taken out of the holder 61 and the housing is removed from the camera. The darkslide loaded with the photographic material is then inserted between the carrier frame 15 and the groundglass frame 17, whereupon the photograph is taken in the usual manner, taking into account the previously determined light measurements.

Figure 4:
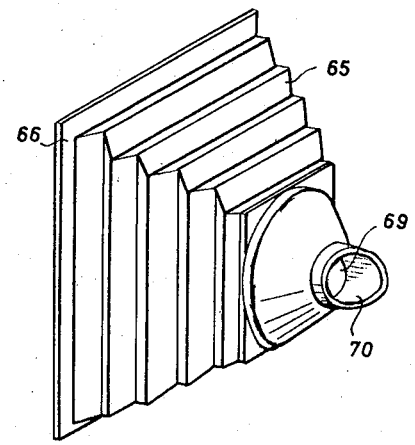
FIG. 4 shows a perspective view of a safe-light bellows with eyepiece which is preferably mounted on the camera behind the groundglass for exposure metering.

In order to obtain accurate results, the entrance of stray-light from the rear through the groundglass 16 must be avoided when taking the light measurement. This is best effected by inserting the rear light protecting slide 53 before every reading of the instrument 60. It is preferable to use also a safe-light bellows 65 to be mounted on the groundglass frame 17, as shown, for example, in FIG. 4. One end of the bellows 65 is joined to a frame 66 which can be removably mounted on said frame 17 by means of a movable locking bar 67 and a lug 68 (FIG. 1) in opposition thereto. The other end of the bellows 65 is closed except for a relatively small viewing aperture 69 which is provided with an eyecup 70.

Advantageously, a magnifying glass may also be built into the aperture 69. In its position of use the device according to FIG. 4 not only prevents disturbing stray-light from falling onto the photoelectric cell 57 when the slide 53 is removed, but also facilitates control of the groundglass 16 and the image projected thereon.

If desired, the carrier arm 55 together with the photoelectric cell 57 may be removed from the housing 51 and inserted into a similar housing for a darkslide camera with another picture format. It is therefore possible to use a single photoelectric cell 57 and the associated indicating instrument 60, which has been calibrated for this cell, in two or more housings 51 of different size. This is of considerable importance to the owner of a camera having an interchangeable darkslide and groundglass carrier.

Some darkslide cameras are not provided with a groundglass of the spring back type shown in FIG. 1. With such cameras a separate groundglass must be inserted into a frame similar in form to a darkslide in place of the latter in order to control the image. For such cameras it is advisable to provide, instead of the glass plate 54 (FIG. 2) in the exposure metering device, a groundglass on which the image can be controlled and sharply focused before taking the photograph. This renders the use of a separate groundglass unnecessary.

Figure 5:
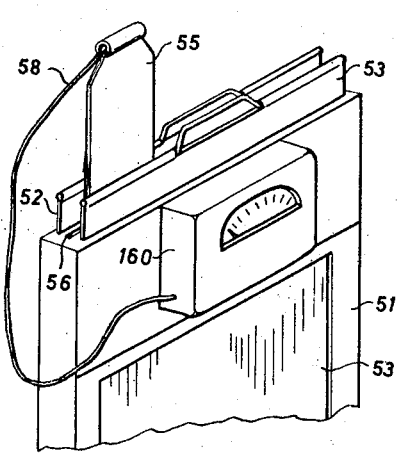
FIG. 5 is a view, similar to FIG. 2, of a part of a second form of embodiment of the exposure metering device.

The form of embodiment of the exposure metering device illustrated in FIG. 5 differs from that described hereinbefore merely in that the electrical indicating instrument 160 is attached directly to the upper part of the frame-like casing 51 and is connected directly to cable 58 without the interposition of a plug. According to a modification (not shown) the instrument 160 could be swivably arranged on the upper part of housing 51, similar to the instrument 60 in FIG. 1. In addition, the instrument 160 could be detachable from the housing so that, together with the withdrawable carrier arm 55 and the photoelectric cell 57, it may be used on a similar housing of another size.

FIG. 6 shows a single front light protecting slide 152 that is not wholly opaque. In one of its corners the slide 152 has a few relatively small apertures 72. When the slide 152 is inserted in the housing 51, the photoelectric cell can be brought into a position behind said apertures 72. While dismounted from the darkslide camera, the exposure metering device may then also be used as an ordinary exposure meter or lux meter. Thereby a much reduced amount of light reaches the photoelectric cell.

In the modification according to FIG. 7 the light protecting slide 252 is provided with a larger aperture 73 which, however, is subdivided into several smaller windows by means of a grid 74. According to FIG. 8 a light protecting slide 352 is also provided with a single aperture 75 in which a raster lens 76 is fitted. The forms according to FIGS. 7 and 8 both have for their object to prevent strong laterally-incident light from reaching the photoelectric cell, as is the case with ordinary exposure meters. Instead of the grid 74 (FIG. 7) or raster lens 76 (FIG. 8) it is possible to provide a window that is translucent but not transparent.

In addition to one of the aforementioned light protecting slides 52, 152, 252 or 352 there may be provided a further slide of the same dimensions which, over its whole area, is a translucent but not transparent diffusing screen and can be inserted in front of the photoelectric cell 57 to carry out certain brightness measurements. A similar result will be achieved by having the photoelectric cell 57 not in front of but arranged behind the glass plate 54 designed to form a groundglass, so that the light from the lens 12 passes first through the groundglass and then falls on the photoelectric cell.

What I claim is:

1. Photoelectric exposure metering device for darkslide cameras adapted for controlling the image by means of a groundglass plate, comprising at least one light protecting slide to prevent light from entering the back of the camera, a photoelectric cell arranged adjacent and behind the slide, an indicating instrument connected to the cell, and a housing for the cell and slide as a structural unit to be applied to the camera.

2. Photoelectric exposure metering device according to claim 1, in which two slides are provided with the ground-glass plate arranged between the slides.

3. Photoelectric exposure metering device according to claim 1, in which at least two housings of different size are provided whereby the single photoelectric cell with its associated indicating instrument will be selectively used in either housing.

References Cited in the file of this patent

UNITED STATES PATENTS

| | | |
|---|---|---|
| 929,671 | Ingersoll | Aug. 3, 1909 |
| 2,217,861 | Frost | Oct. 15, 1940 |
| 2,990,757 | Ponsar | July 4, 1961 |

FOREIGN PATENTS

| | | |
|---|---|---|
| 746,837 | Great Britain | Mar. 21, 1956 |